Jan. 8, 1963  R. J. MOULY  3,071,967
ELECTRICAL MEASURING AND CONTROL APPARATUS
AND A GLASS PRESS EMBODYING THE SAME
Filed April 11, 1958  10 Sheets-Sheet 9
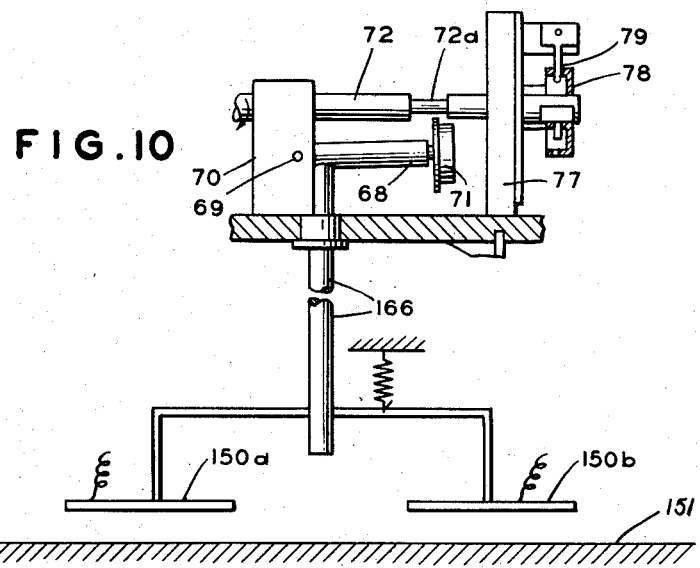
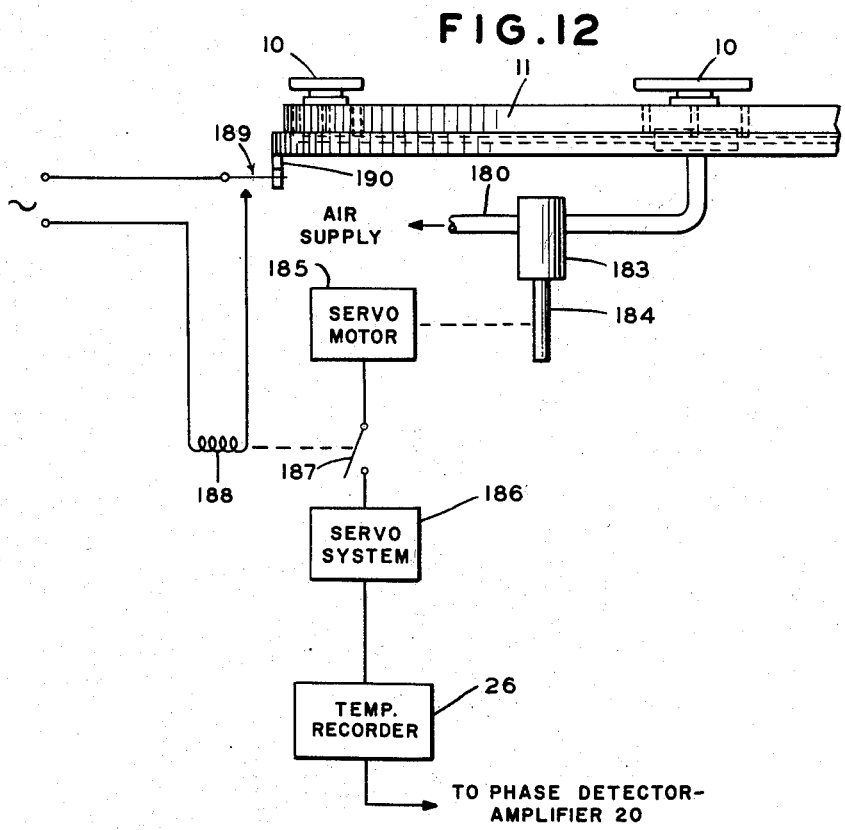

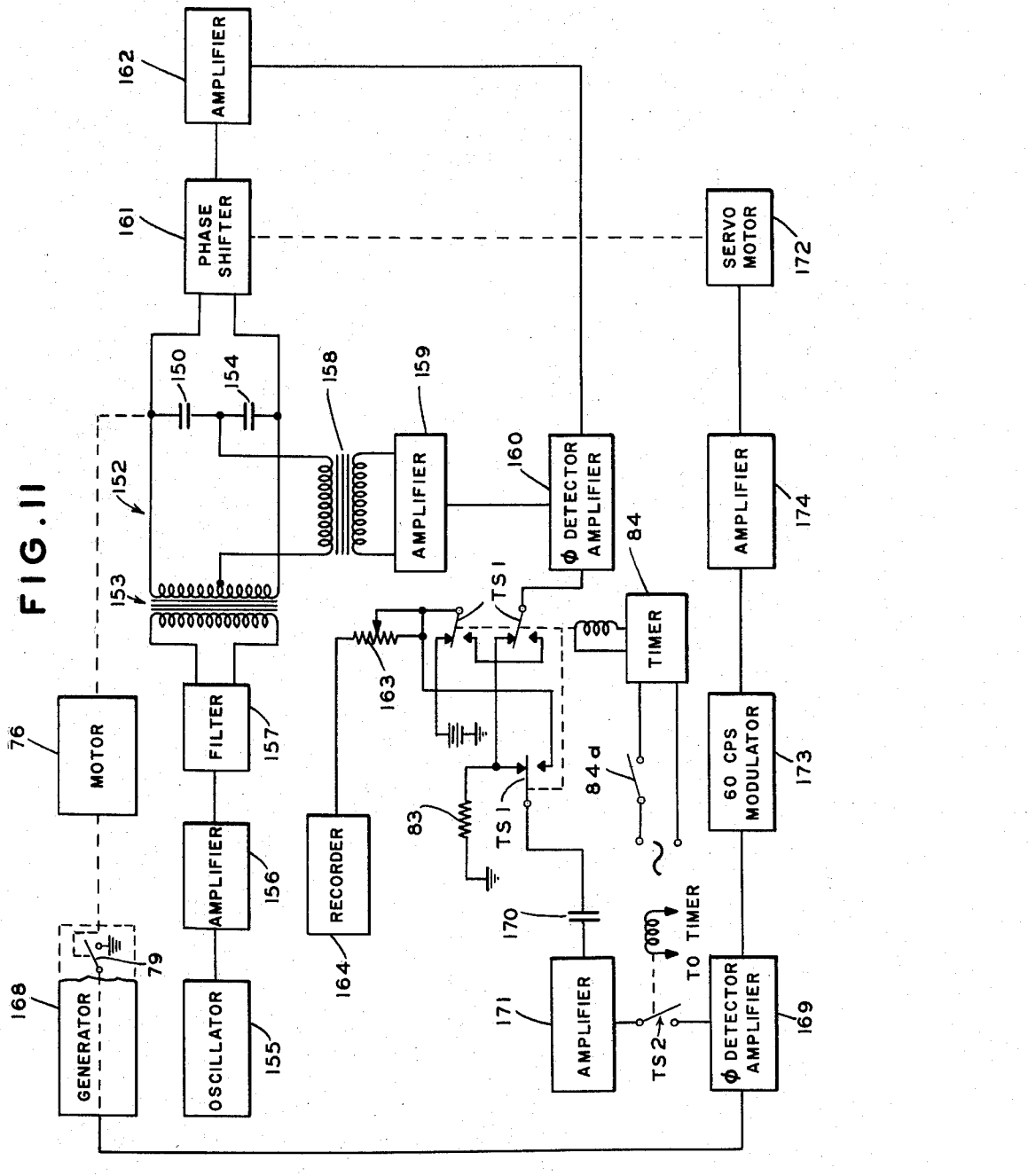

ered Jan. 8, 1963

3,071,967
ELECTRICAL MEASURING AND CONTROL APPARATUS AND A GLASS PRESS EMBODYING THE SAME
Raymond J. Mouly, Corning, N.Y., assignor to Corning Glass Works, Corning, N.Y., a corporation of New York
Filed Apr. 11, 1958, Ser. No. 727,825
22 Claims. (Cl. 73—362)

This invention relates to a temperature measuring system in which variations in the electrical properties of an object with a change in its temperature are utilized to provide an indication of the direction and amount of the change in its temperature.

It has long been known that the electrical properties of materials are affected by or vary with the temperature thereof. It has heretofore been proposed to detect a change in temperature from a predetermined value by measuring the current induced in the material by means of a suitable electrical energy radiator. For example, an apparatus has been proposed for determining the temperature of electrically conductive bodies by means of one or more electromagnetic coils excited by alternating current connected in one of the arms of a bridge network which is balanced for conditions corresponding to a predetermined temperature of the object undergoing measurement. In recognition of the fact that the measurement of the energy absorption results in a signal which contains two components related respectively to a change in temperature and a change in distance and that these components differ in phase, the apparatus proposed included a phase shifter so as to permit adjustment of the apparatus for a predetermined temperature to a condition of reduced sensitivity to the distance component and relatively greater sensitivity to the temperature component.

I have found apparatus hitherto proposed to be entirely unsuitable for the measurement of temperatures when a high degree of accuracy is required. Because the direction in the impedance plane along which the temperature component of the signal current is unaffected by the distance variations changes with the temperature, it is necessary to take into account the variations in phase shift required at different temperatures to null out the effect of incidental distance changes in order to provide such an apparatus capable of indicating with a high degree of accuracy a relatively small change in temperature from a value which is not fixed or known beforehand. An important advantage of my invention results from the accuracy with which the direction and amount of even a small change in temperature is indicated.

Another factor which affects the accuracy of the measurement obtained by means of such apparatus is the change in the characteristics of the sensing element such as those, among others, which may occur with time or temperature. This is especially significant where the apparatus is intended for use in connection with a relatively high temperature process for the high speed, mass production of a product, the quality of which is dependent upon rigorous temperature controls.

It also follows, that when such a system is utilized to control the distance of an object whose temperature is varying then the changes in the impedance of the radiator resulting from such temperature variations should similarly be rendered ineffective.

It is, therefore, a principal object of this invention to provide a system for measuring the temperature of an object irradiated by electrical energy from a radiator by means of the variations in the impedance of the radiator due to such temperature and distance, the measurements being made in such a manner as to provide mutually independent temperature and distance measurements.

An important feature of the present invention is the use of an electrical energy radiator, the impedance of which is affected by the energy absorbed in an object exposed thereto, the energy absorbed being a function of the instantaneous temperature of the object and the distance between the object and the radiator. The change in impedance results in voltage variations, conveniently termed the "error" signal which is compared to the voltage across an equivalent radiator disposed so as to be unaffected by the variations caused by the object under observation. To obtain a temperature measure, the error signal is compared to a reference signal of such phase as to provide, for any temperature, T, of the observed object, a measurement of the component of the error signal which is affected only by a change in temperature and therefore corresponds to a temperature change, $\Delta T$.

Another important feature of this invention resides in modulating the error signal in such a way as to introduce a variation therein which corresponds to the error signal variation which results from a distance change when the temperature is constant. The phase of the reference signal is continuously and automatically adjusted by reference to the modulating signal to maintain that phase relationship with the error signal as to insure the derivation of an output which is a function of the temperature changes and which is independent of distance variations.

In one embodiment of the invention a monitoring radiator and a reference radiator, connected in the adjacent arms of a bridge network are mounted in juxtaposed relationship with the monitoring radiator in a position to irradiate the object whose temperature is to be measured while the reference radiator is electrically independent of the object and is uninfluenced thereby. At least the monitoring radiator is subjected to a periodic displacement while it is electrically coupled with the object so as to modulate the amplitude of the voltage across the monitoring radiator at a predetermined frequency which differs sufficiently from the frequency of the excitation voltage in the monitoring radiator to facilitate separation or detection of the modulation frequency.

When the monitoring radiator is in the form of an electromagnetic coil, another way in which the reluctance of the magnetic circuit may be modulated is by periodically displacing a pole piece of magnetic material in the gap between the coil and the target or in a gap formed in the magnetic circuit in series therewith. Thus, a pole piece of magnetic material may be mounted for rotation in an air gap formed in the magnetic circuit which includes the irradiated object and the coil. The rotation of such a pole piece provides an alteration of the number of lines of flux linking the monitoring coil to the observed object periodically at a frequency corresponding to the rate of rotation of the pole piece.

Another feature of the present invention relates to the provision of a container for the monitoring and reference radiators so as to maintain their temperature substantially constant and at a value which is an optimum to minimize spurious effects.

In accordance with a further and important variation the impedance of the two radiators is automatically periodically compared and calibrated so as to render the apparatus substantially independent of variations which would otherwise result from a change in their temperatures or electrical characteristics.

As has been indicated, the present invention provides for the elimination of such spurious signals as those which result from the variation in the distance between the object under observation and the sensing apparatus and which adversely affects the accuracy of the temperature measurement. A further feature of the present invention involves the avoidance of loss of accuracy due to relatively large distance variations. Large distance variations which are not as effectively dealt with by proper phase adjustments may result from various causes and often result from the fact that the successive objects whose temperature is to be observed do not have uniform dimensions. In accordance with the present invention the distance between the sensing apparatus and the object under observation is readily determined and the distance measurement signal is utilized to adjust the distance to a predetrmined value. While the distance adjustment is susceptible of being carried out with precision, the combination of phase shift to null out distance dependent effects together with automatic distance control to maintain distance variations within predetermined limits is especially advantageous.

Further objects as well as advantages of the present invention will be apparent from following description and the accompanying drawings in which—

Figure 4:
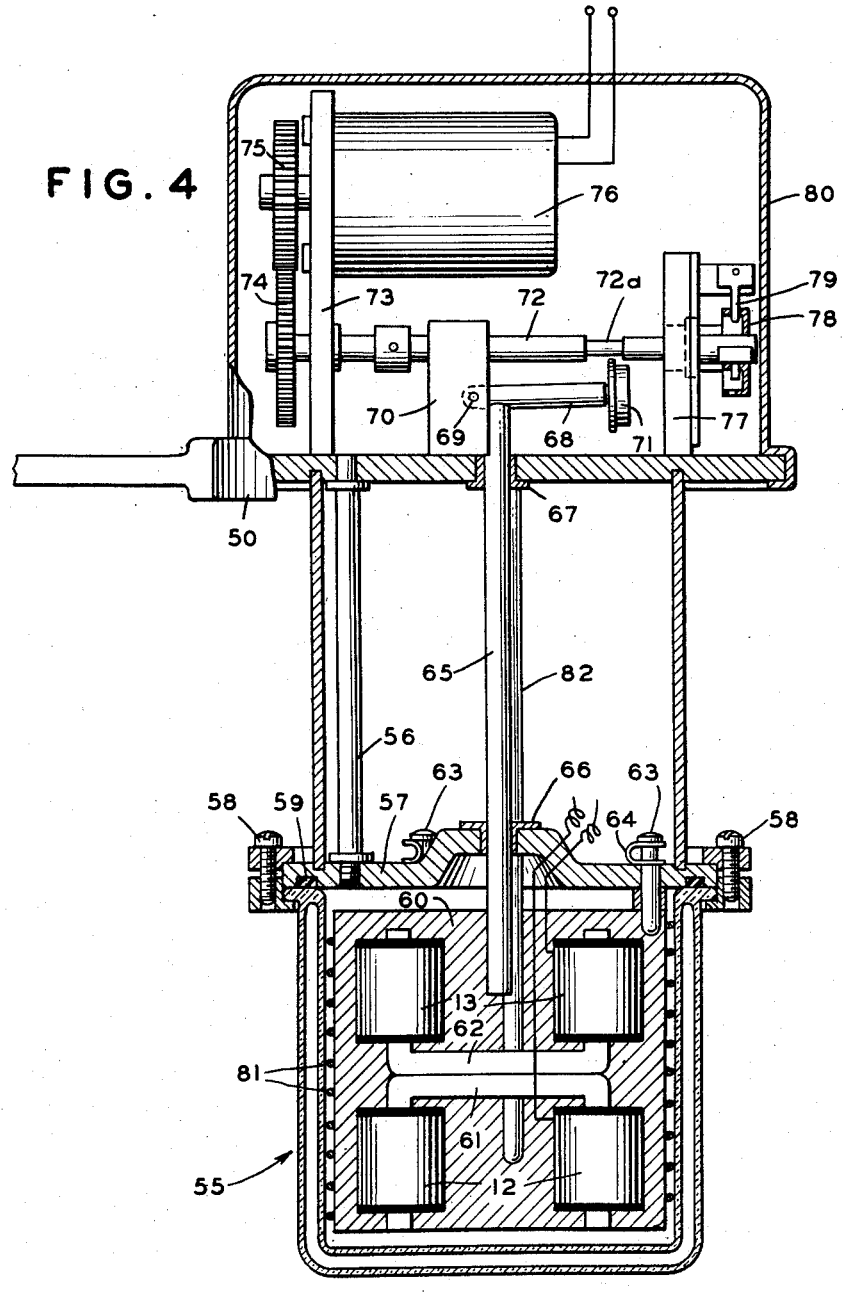
FIGURE 4 is an elevational view, partially in section, showing the temperature sensing components in greater detail.
Figure 5:
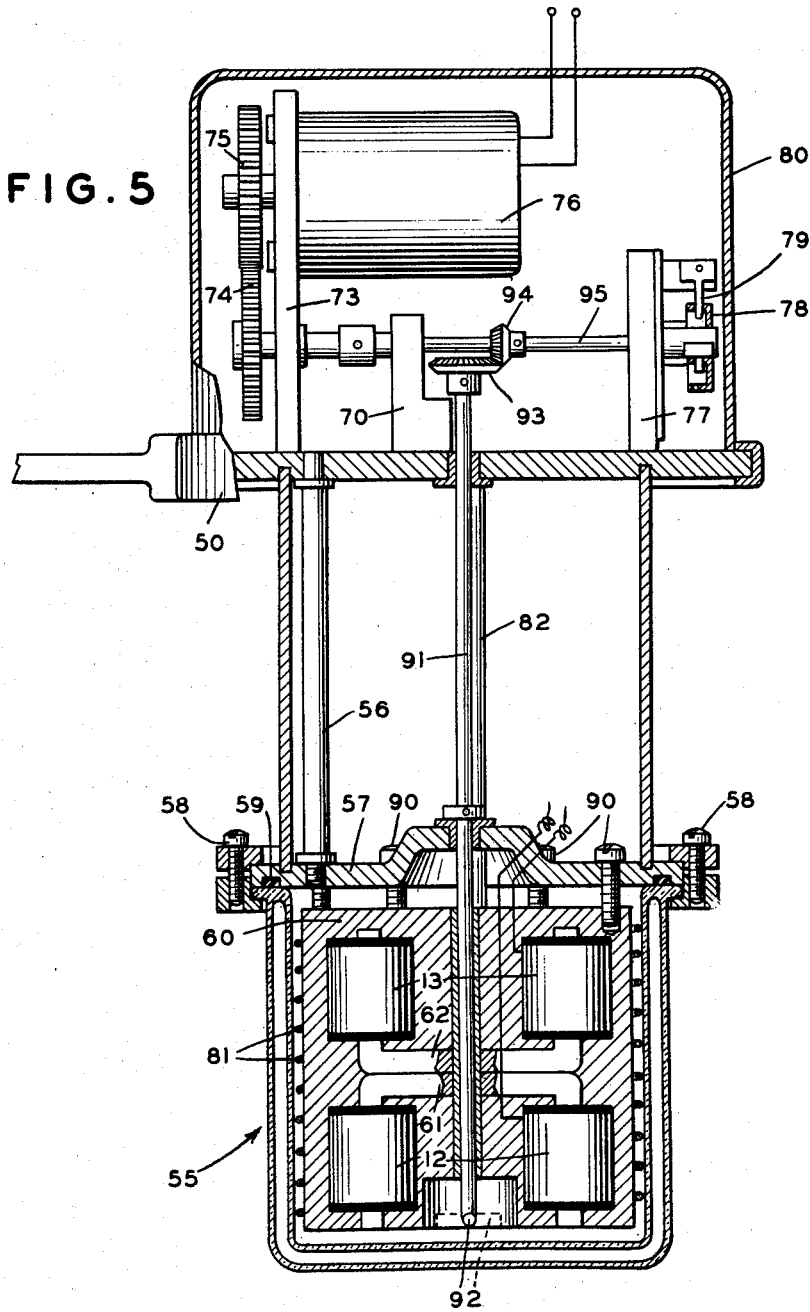
Figure 6:
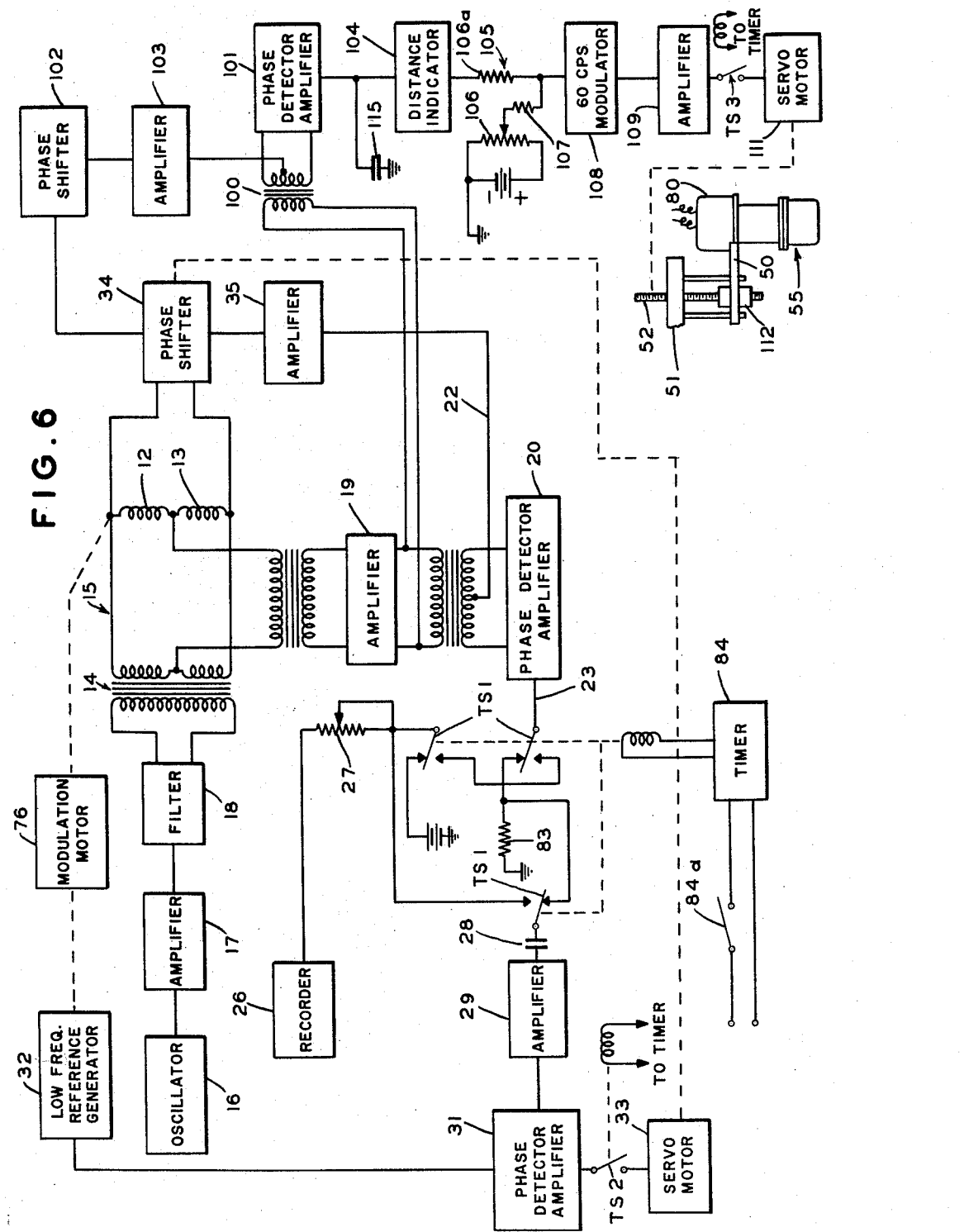
Figure 7:
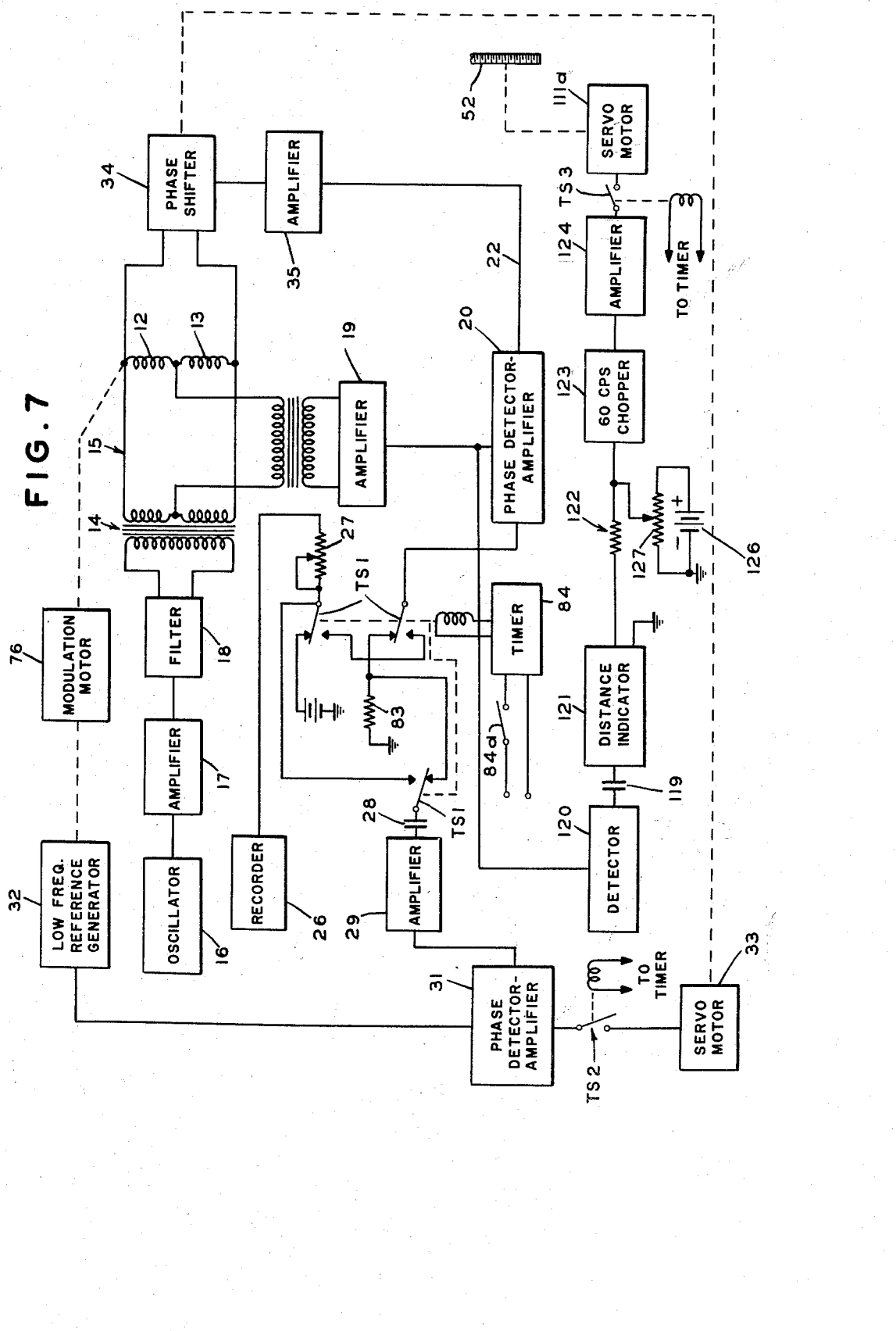
Figure 8:
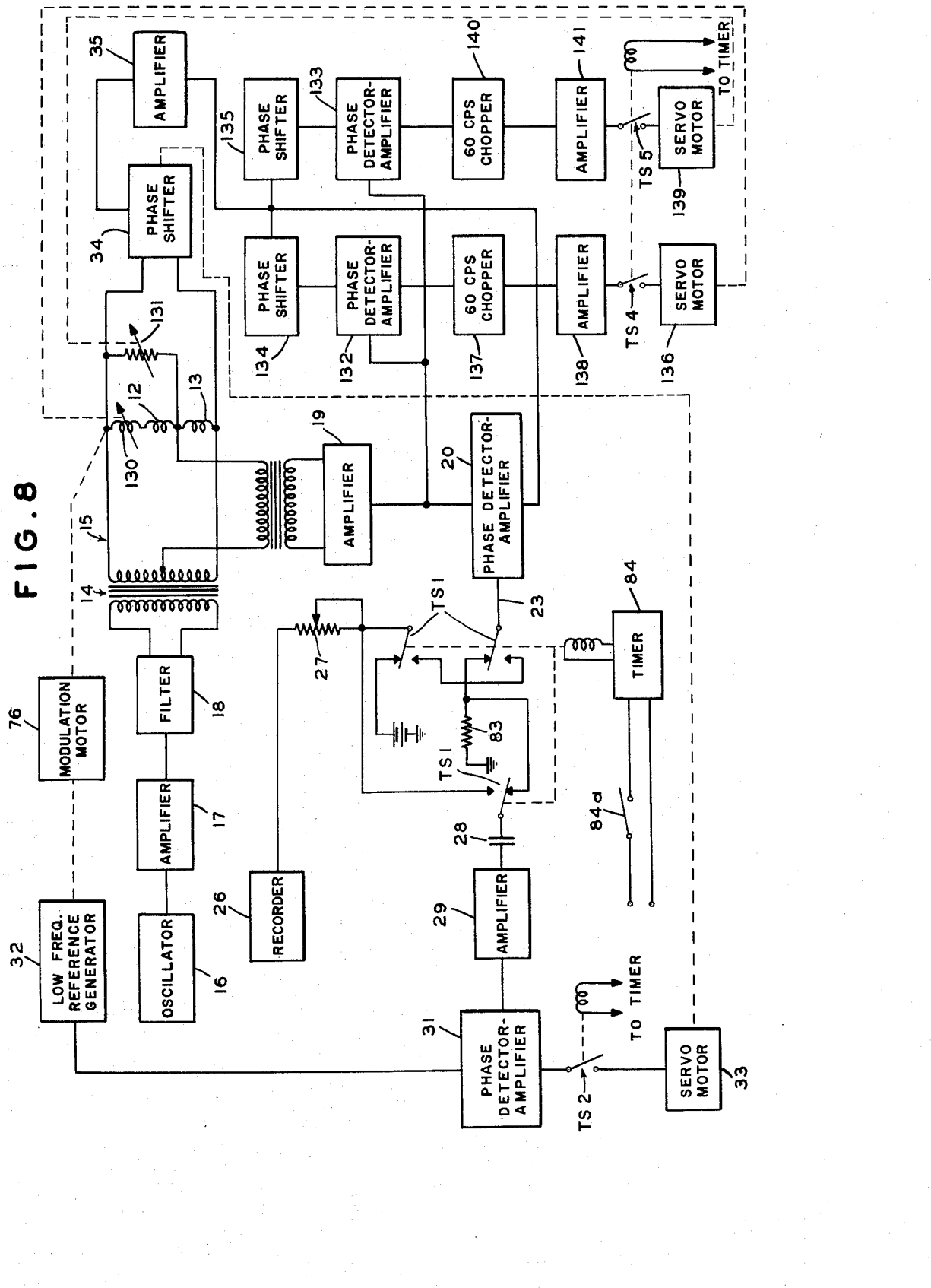
Figure 9:
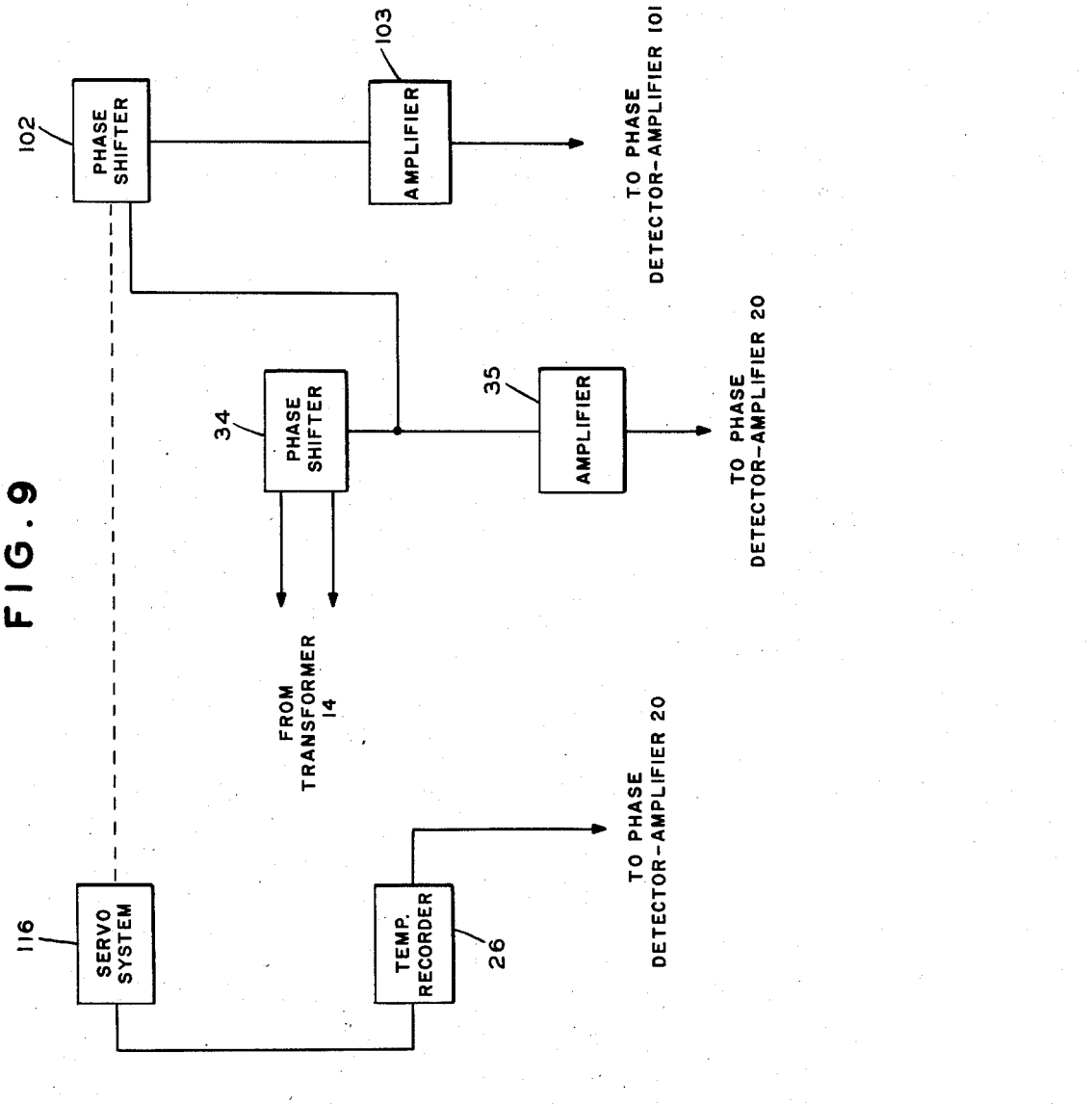

FIGURE 5 is a view similar to FIGURE 4 of another arrangement of the temperature sensing elements; and FIGURES 6–12 are each diagrammatic views illustrating further features of the present invention, the system shown in FIGURE 6 incorporating an arrangement for automatically measuring and adjusting the distance between the radiator and the object irradiated thereby, FIGURE 7 showing another arrangement for measuring and adjusting the distance between the radiator and the object irradiated, FIGURE 8 showing an arrangement for automatically maintaining the balance of the bridge network, FIGURE 9 showing a modification of the arrangement shown in FIGURE 6, FIGURES 10 and 11 showing an arrangement in which a capacitive radiator is utilized, and FIGURE 12 showing automatic control of the coolant for the glass molds.

An embodiment of the present invention will be described in connection with the molding of glass products, the quality of which is dependent to a large extent upon the temperature of the molds. Apparatus constructed in accordance with the present invention is especially well suited for use in controlling the temperature of such molds but it is recognized that it may be used generally wherever it is desired to determine or control the temperature and/or distance of an object the effect of which on the impedance of an electrical energy radiator varies with changes in its temperature or distance from the radiator.

Figure 1:
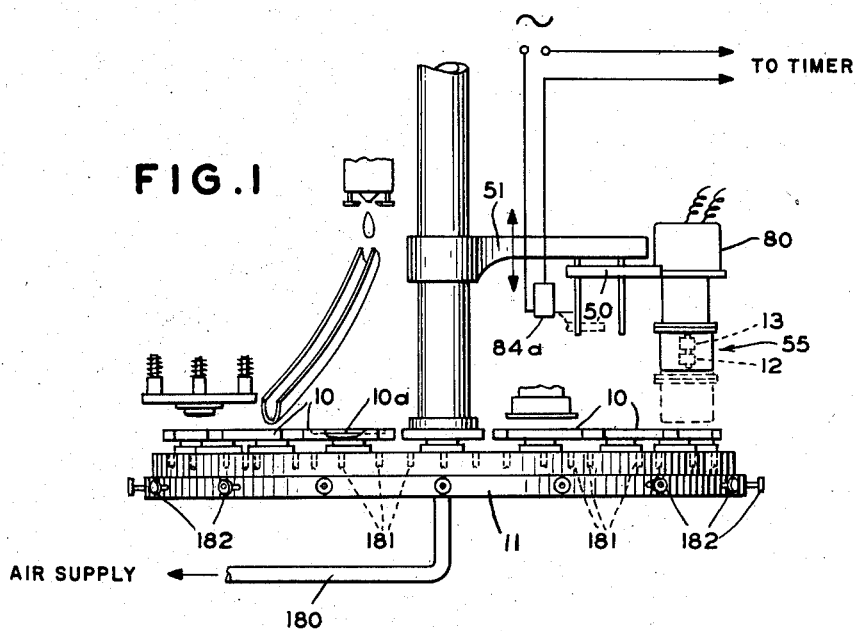
FIGURE 1 is an elevational view, partially diagrammatic, of a glass press embodying the present invention.

Referring now to FIGURE 1, mold 10 is one of a plurality of conventionally constructed molds mounted on an indexing press table 11 and carried thereby successively through stations including one where a gob of glass is dropped onto the mold, a second where a plunger is brought down upon the glass to conform it to the shape of the mold, a third where the molded glass panel is removed from the mold. The mold is heated from contact with the hot glass and between the third and first stations the temperature of the mold is measured and controlled so that it is at a suitable temperature to receive the next gob of glass when it returns to the first station.

As indicated diagrammatically, coils 12 and 13 are mounted so that they may be juxtaposed to the mold 10 immediately after a glass panel has been removed therefrom. The sensing or measuring coil 12 is positioned so as to illuminate electromagnetically the central portion of the glass contacting surface $10a$ of mold 10 while coil 13 is positioned so that its radiation does not reach the mold.

In the case of an inductor in the form of an electromagnetic coil such as coil 12, its resistance R and its inductive reactance $\omega L$ characterize its electrical properties. Analysis has shown that the resistance and the inductance of an iron cored coil are each affected by its distance from and the temperature of an object such as magnetic stainless steel mold 10, the axis of the coil being normal to the surface of the mold. In the case of a magnetic stainless steel mold at a temperature less than its Curie point, generally an increase in the distance results in a decrease both of the inductive reactance and the resistance. On the other hand, the distance being constant, an increase in the mold temperature causes an increase in the permeability and resistivity of the mold with the result that the inductive reactance of the inductor increases and its resistance decreases. When plotted on an impedance graph, the direction of an impedance change indicates whether the change resulted from a change in temperature or distance or both.

Figure 2:
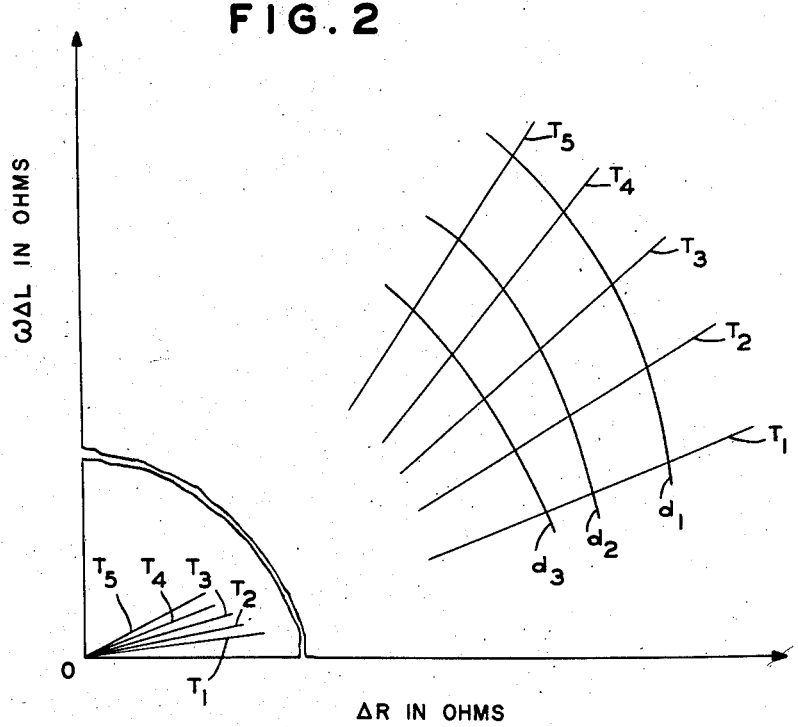
FIGURE 2 is a graph showing the inductive and resistive impedance changes which take place with changes in temperature of the object under observation and with changes in distance between the object and an electromagnetic radiator.

In the impedance graph, FIGURE 2, where the scale has been exaggerated for clarity, changes in inductive reactance, $\omega \Delta L$, in ohms are plotted along the vertical axis and changes in resistance, $\Delta R$, are plotted in ohms along the horizontal axis. The curves, $T_{1-5}$, represent the plots of recordings made at five successively greater temperatures at three successively greater distances $d_{1-3}$. The curves $T_{1-5}$ are convergent toward a point having the coordinates 0,0 which represents the impedance of the inductor at an infinite distance from the object. In view of the angular displacement of the tangent to the curves $T_{1-5}$ at points corresponding to constant distance, it is necessary to take into account the instantaneous phase relationship between the temperature change component and the distance change component of the measurement signal corresponding to the amplitude of the unbalance voltage developed in a bridge network. Unless this is done the resulting measurement in addition to the desired temperature change will also reflect the undesired distance change.

Figure 3:
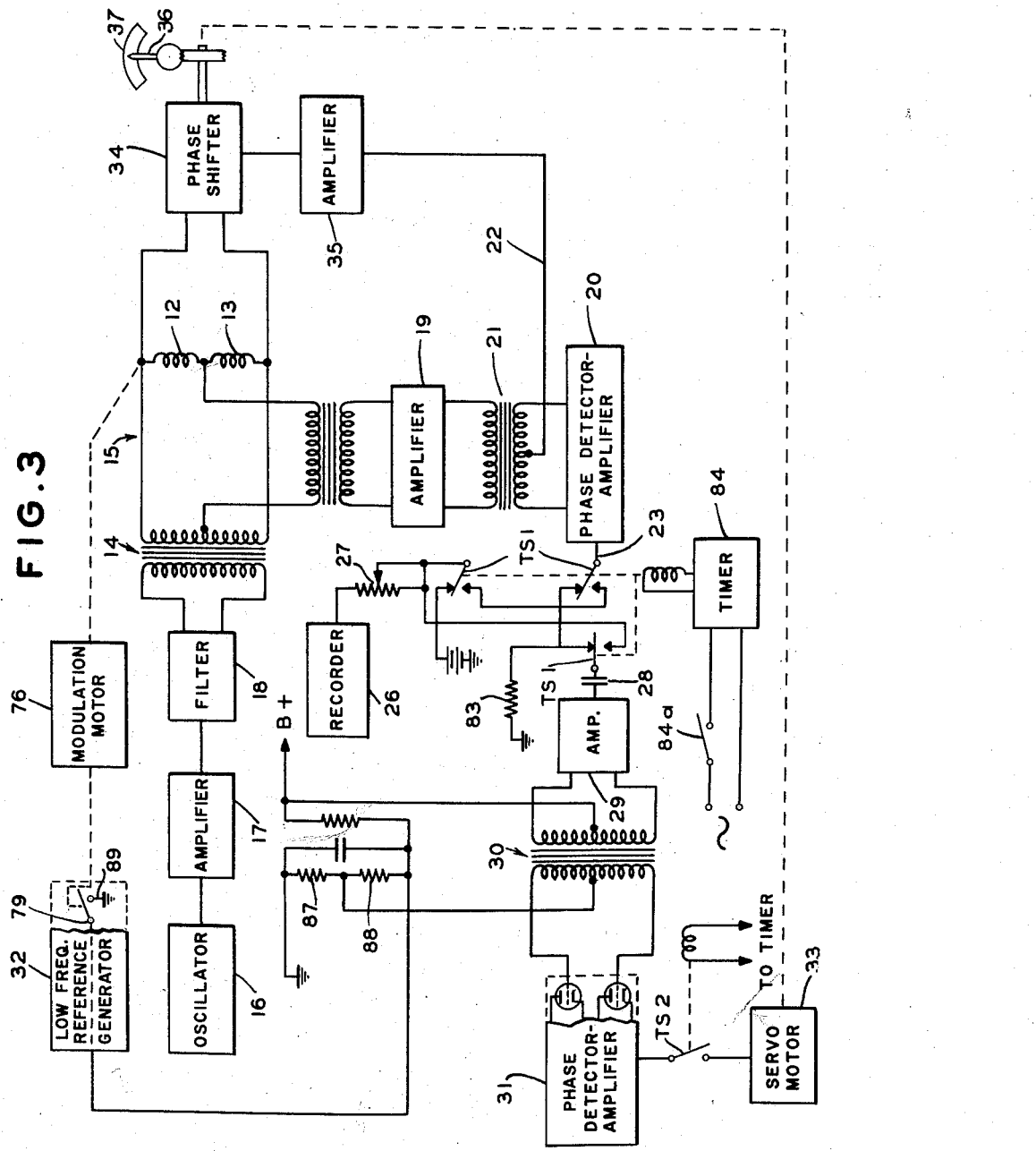
FIGURE 3 is a diagrammatic view showing a preferred embodiment of the temperature measuring system of the present invention.

In the arrangement shown diagrammatically in FIGURE 3, coils 12 and 13 are connected across the secondary winding of a bridge transformer 14 to form bridge network 15, the voltage across the diagonal of which, when the balance of the bridge is disturbed, provides the error signal which, as has been indicated, comprises a temperature measuring component and a distance measuring component. The primary of transformer 14 is supplied from a tuning fork oscillator unit 16 whose voltage, about 1.5 v. r.m.s. at audio frequency, is amplified by amplifier 17 and passed through band pass filter 18 to provide a sinusoidal signal. Noise and undesirable D.-C. components are blocked out by the A.-C. coupling provided through transformer 14.

Error signal amplifier 19 is a multistage amplifier with A.-C. coupling between successive stages to provide a high degree of amplification of the A.-C. components at the frequency provided by oscillator unit 16. Tuned LC networks are included to attenuate noise and unwanted A.-C. components including harmonics.

The output stage of amplifier 19 is coupled to phase sensitive detector-amplifier 20 through transformer 21 which also serves to provide desired tuning. Lead 22, connected to the center tap of the secondary winding of transformer 21 carries a reference signal having a phase such that it is in quadrature with the component of the error signal which reflects changes in distance between coil 12 and surface $10a$ of the mold as will be pointed out in detail hereinafter. Phase sensitive detector-amplifier 20 is fed both the reference signal and the voltage which appears across the secondary of transformer 21 and normally provides an output which is proportional to the amplitude of the error voltage as compared to the amplitude of the reference voltage, the latter functioning as a switching voltage for phase sensitive detector-amplifier 20. In this connection, attention is directed to the Department of the Army Technical Manual TM 11–668, September 1952, pages 93–94 and FIG. 87 for a typical phase detector circuit and for the theory of operation involved therein. In view of the fact that the reference voltage is 90° out of phase with the component of the error voltage which corresponds to a distance change, the output of phase sensitive detector-amplifier 20 has substantially zero sensitivity to that component so that the output appearing at 23 is a D.-C. voltage whose amplitude is substantially strictly a function of temperature variations of mold 10 and the sense of the voltage corresponds to the direction of the temperature variations when bridge network 15 has been balanced or zeroed for a specific reference temperature. It is to be noted that detector-amplifier 20 is constructed, as is well known, to provide D.-C. amplification and preferably includes a low pass LC network between its detector and amplifier stages. The output stage of detector-amplifier 20 may comprise a cathode follower stage, the cathodes of which are connected to the driving coil of a suitable recorder 26 through a variable series resistor 27 which provides a convenient sensitivity adjustment.

Recorder 26 may be of any convenient type and, for example, may be of the type which includes a continuously driven chart and a stylus whose position with respect to the chart is controlled by the amplitude and direction of the voltage applied to its coil.

Because the temperature of mold 10 is not constant and due to the possibility of distance variations between the mold and the measuring radiator 12, it is necessary to effect such adjustment that the apparatus has zero sensitivity to signal components which reflect a change of distance at the instantaneous temperature of the mold being sensed. In one embodiment the desired adjustment is continuously effected by a modulating voltage which appears across the diagonal of bridge network 15 so as to introduce a component having a predetermined frequency and which corresponds to the error signal variation which results from a distance change. The component thus introduced may conveniently be designated the distance modulation signal and in the present embodiment appears as an amplitude modulation of the frequency utilized to energize bridge network 15. As will be more fully pointed out hereinafter, this is conveniently accomplished by physically displacing radiator 12 towards and away from mold 10 through a relatively short distance. With the bridge network energizing frequency at 200 c.p.s., modulation of the distance between mold 10 and coil 12 at a 20 c.p.s. frequency provides a continuous 20 c.p.s. amplitude modulation of the 200 c.p.s. frequency voltage across coil 12.

The 20 c.p.s. frequency voltage component across the secondary of transformer 21 appears in the output of detector-amplifier 20 where, due to the A.-C. coupling provided by capacitor 28 it is passed to amplifier 29 tuned to provide amplification of this low frequency. The output of amplifier 29 is fed through transformer 30 to a pahse sensitive detector-amplifier 31 in the same way that transformer 21 provides coupling to phase sensitive detector-amplifier 20. In the present instance the reference or switching voltage which is applied to the center tap of the secondary of transformer 30 and to the input of phase sensitive detector-amplifier 31 is derived from a suitable source 32 which is switched in step with the displacement of coil 12. The output from phase sensitive detector-amplifier 31 is an average D.-C. voltage having an amplitude which corresponds to the amplitude of the 20 cycle modulation component at the output of detector-amplifier 20 and the cosine of the phase angle difference between the 20 cycle reference switching voltage and said 20 cycle modulating voltage while the direction of the output is a function of the sign of said cosine.

The output from detector-amplifier 31 is utilized to operate, in the conventional way, a servomotor 33 for a duration and in a direction corresponding respectively to the amplitude and sense of the voltage applied thereto. A suitable gear train is provided between the shaft of servomotor 33 and the tuning shaft of phase shifter 34, the latter being supplied with a 200 c.p.s. signal from oscillator 16 as indicated. In this connection, attention is directed to "Pulse and Digital Circuits," Millman and Taub, pages 496–479, McGraw Hill, 1956 for a typical phase shifter or resolver circuit and the theory involved therein. Referring again to FIG. 3, the output of phase shifter 34, amplified at 35, appears across lead 22 and ground (not shown) which provides the reference switching voltage for phase sensitive detector 20 as was pointed out hereinabove. Servomotor 33 operates phase shifter 34 through its gear train in such a direction as to cause the 200 c.p.s. reference voltage appearing at lead 22 to be in quadrature with the 200 c.p.s. signal due to the distance modulation of coil 12 which appears across the secondary of transformer 21. Under these conditions, the 20 cycle voltage which would otherwise appear at the output of phase sensitive detector 20 is zero.

Because of the automatic adjustment of the phase relationship between the 200 c.p.s. switching voltage and the error signal fed to phase detector-amplifier 20, the input voltage to recorder 26 provides an accurate measure of the instantaneous temperature of the portion of the object irradiated. By properly selecting the operating frequency, in the present instance 200 c.p.s., the portion of the mold that is observed may include more or less of its subsurface. In fact, the present apparatus is also effective in determining temperature of a portion of the mold even with the glass object being formed still in position on the mold. Thus, it is not necessary that the glass object by removed.

It is to be noted, that due to the adjustment of the movable component of phase shifter 34 to provide at any temperature a reference voltage which is in quadrature with the distance dependent component of the signal, the instantaneous position of this component relative to a calibrated "zero" position may be used to provide the indication or measure of the temperature of the object under observation. Thus, in some instances it may be desirable to provide a pointer 36 on the rotatable shaft of phase shifter 34 which, in sweeping over the appropriately graduated scale 37, indicates the temperature of the object or mold. In other words, the phase position of the output of phase shifter 34 relative to its input is a function of the temperature of the mold.

As has been pointed out, a switching voltage at the frequency at which the error signal is modulated, 20 c.p.s. in the present instance, is derived from generator 32 and applied to the center tap of the secondary winding of transformer 30 which, in turn, is connected to the input circuit of phase sensitive detector-amplifier 31. Turning now to FIGURES 1 and 4, there is shown a preferred arrangement for modulating the error signal and for deriving a switching voltage having the same frequency, as well as other features of the present invention. Platform 50 is supported by a vertically movable carriage 51 and may be connected thereto in any convenient manner so that platform 50 may be readily moved into and out of a position which is a predetermined distance from that which the surface of the mold 10 occupies at the time the measurements are carried out. Displacement of carriage 51 may be effected in any convenient manner. Where, as in the present instance, the press table and its various appurtenances are pneumatically actuated by means of air under pressure, then it is most convenient to provide for similar operation of carriage 51. A valve actuated by the indexing of press table 11 controls, by the admission of the pressure fluid to one side or the other of a piston (not shown) movement of carriage 51 upward to a position removed from press table 11 when the latter is being indexed and downward to place the monitoring coil 12 adjacent to a mold when press table 11 has completed its movement and positions the next mold under carriage 51.

A container 55 is suspended from platform 50 by means of studs 56 connected to its cover 57 to which it is in turn secured by means of bolts 58 which serve to compress an O-shaped ring gasket 59. Mounted in container 55 and resiliently supported from cover 57 is a block 60, formed of a suitable material such as an epoxy resin, in which sensing or monitoring coil 12 and reference coil 13 are embedded in back-to-back relation. That is to say, U-shaped cores 61 and 62 of coils 12 and 13, respectively, are mounted so that core 61 opens downward toward the bottom of container 55 and core 62 opens upward toward cover 57 (as viewed in FIGURE 4).

Studs 63 connected to block 60, each extend through an opening in cover 57 and through apertures formed in the opposed arms of a U-shaped spring member 64. The mounting is such as to permit limited vertical displacement of block 60 and the coils carried thereby relative to container 55, springs 64 providing a restoring force and studs 63 being dimensioned relative to their openings in cover 57 so as to have a running fit therein. Extending through bushings 66 and 67 mounted in cover 57 and platform 50 respectively is a connecting rod 65 having its lower end portion connected to block 60 and having its opposite end connected to an arm 68 for oscillation therewith as will now be described. Arm 68 is pivotally connected as indicated at 69 to support member 70 which in turn is fixed on platform 50. A cam rider 71 is rotatably mounted on the free end of arm 68 and engages a cam surface 72a formed on a shaft 72. One end of shaft 72 is journaled through support bracket 73 and has fixed thereto gear 74 in mesh with gear 75 fixed to the output shaft of motor 76 which is also supported by bracket 73. The other end of shaft 72 is journaled through bracket 77 and has fixed thereto an actuator or commutator 78 positioned to open and then close switch 79 as cam rider 71 engages and then leaves the dwell of cam 72a. Housing 80 secured to platform 50 provides an enclosure for the elements mounted on the platform.

With motor 76 connected to a suitable source of electrical power, as indicated, shaft 72 is rotated thereby, through meshing gears 74, 75 at a rate of 20 revolutions per second so that the dwell of cam 72a engages and depresses cam rider 71 and its arm 68 twenty times in each second. At the same rate, actuator 78 opens and closes switch 79 as will be more fully pointed out. Downward motion of arm 68 is transmitted to connecting rod 65 which in turn shifts downward block 60 in which coils 12 and 13 are embedded. The downward movement of block 60 causes compression of springs 64 by studs 63. When rider 71 leaves the dwell of cam 72a and the displaced members, arm 68, rod 65, block 60 and coils 12 and 13, are free to rise, they are urged upwards under the influence of springs 64. The displacement of coil 12 need only be great enough to cause a discernible change in the magnetic coupling between the coil and the object undergoing observation. In practice, displacement of rod 65, block 60 and coils 12 and 13 through 0.001 inch has provided the desired modulation for the error signal.

Container 55 is double walled as indicated for purposes of thermal insulation and is formed of glass which may be provided with a heat reflecting coating to minimize the effect of the wide variations in temperature to which coils 12 and 13 would otherwise be subjected when container 55 is alternatively juxtaposed to and withdrawn from a position adjacent to the surface of one of the molds 10. The portion of the wall of container 55 through which coil 12 irradiates the mold, is transparent to radiant energy at the measurement frequency. Block 60, in addition to rigidifying the coil assemblies, also forms a heat sink which provides further thermal stabilization. Additional means for controlling the temperature of coils 12 and 13 may be provided in the form of an electrical heater winding 81 mounted within container 55 and surrounding block 60. Heater 81 is connected to a source of suitable electrical power (not shown) controlled in the usual way by thermostat 82, the lower portion of which, as shown in FIGURE 4, extends through an opening provided in cover 57 and is embedded within block 60. Thermostat 82 may be a mercury column type thermostat, the circuit of heater 81 being controlled so as to maintain the temperature, for example, 50° C., substantially at an optimum for maximum stability in the characteristics of the coils.

As has been indicated hereinabove the cyclic displacement of coil 12 at a rate of 20 times per second results in a 20 c.p.s. amplitude modulation of the error signal fed from the bridge 15 to amplifier 19. This 20 c.p.s. modulation frequency when detected and amplified at 31 is fed to servomotor 33 which in turn controls the phase of the 200 c.p.s. reference or switching voltage applied to the center tap of transformer 21. Switch 79, together with actuator 78, is included in the low frequency reference generator 32 (FIGURE 3). The opening and closing of switch 79 in step with the periodic displacement of coil 12 provides the switching voltage for phase detector-amplifier 31. As shown in FIGURE 3, the center tap of the secondary of transformer 30, connected to the input circuit of phase detector-amplifier 31, is connected directly to ground through resistor 87 and through resistor 88 to the pole of switch 79 and, by a parallel connection to the B+ supply, the other side of switch 79 being grounded as indicated at 89. Closing of switch 79 provides a ground for the D.-C. voltage which otherwise would be provided through resistor 88 to the center tap of the secondary of transformer 30 with a consequent drop in the D.-C. voltage applied to the input of phase detector-amplifier 31. The timing of the closing and opening of switch 79 with the occurrence of the passage through zero of the 20 c.p.s. modulation signal may be readily effected. In this way synchronization of the operation of phase detector-amplifier 31 for maximum sensitivity to the 20 c.p.s. modulation frequency is assured.

It is desirable that the temperature recorded on the chart of recorder 26 only reflect the temperature of the mold under observation after the necessary adjustment of phase shifter 34 has been effected. To this end a timer 84 is provided, the energizing circuit of which is controlled by carriage 51. Switch 84a is positioned to be closed when carriage 51 is started on its downward movement. Timer 84 may be of conventional construction and is connected so as to program the recording of the temperature by recorder 26 so that it occurs after the carriage has positioned monitoring coil 12 adjacent to the surface of the mold whose temperature is to be determined. Preferably the timing cycle of timer 84 is adjusted so that the temperature is recorded after the system has had time to detect any deviations in the temperature of the mold from the predetermined temperature for which the apparatus is balanced and the necessary adjustment of phase shifter 34 has been effected. Timer 84 controls triple pole switch TS1 so as to open the circuit between phase detector-amplifier 20 and recorder 26, a suitable load such as resistor 83 being then connected in circuit with the phase detector-amplifier 20 and a suitable D.-C. voltage source being then connected in circuit with recorder 26 to maintain the stylus of the latter at a desired position in relation to the chart during the period when a temperature is not being recorded. Timer switch TS2 is connected in the energizing circuit of servomotor 33 so that when switch TS2 is open the motor is deenergized and rendered ineffective to disturb the adjustment of phase shifter 34. In normal operation timer 84, due to sequential energization of its controlling relays, first closes switch TS2 after carriage 51 has lowered monitoring coil 12 into its position adjacent to a mold. After a time interval sufficient to permit operation of servomotor 33 to adjust phase shifter 34 as required by the temperature of the mold under observation, then switch TS1 is closed by the timer and the recorder is connected in circuit with phase detector-amplifier 20 and is energized thereby. The cycle of timer 84 is adjusted to provide the desired interval during which the temperature is determined and recorded. When the timer has run through its cycle, switches TS1 and TS2 are opened, the cycle of the timer being shorter than the time interval between successive indexing movements of press table 11. When press table 11 is indexed, carriage 51 is raised and is lowered again after the rotation of press table 11 to position a new mold under the carriage has been completed.

In FIGURE 5 there is shown another arrangement for producing amplitude modulation of the error signal. Here similar parts have been designated by the same reference characters used in FIGURE 4 in order to avoid unnecessary repetition. Block 60 with coils 12 and 13 embedded therein is suspended within container 55 from cover 57 to which it may be rigidly connected by bolts 90. Rod 91 extends through cover 57 and carries at its lower end in the gap between the ends of core 61 an elongated member or pole piece 92 formed of magnetic material. The upper end of rod 91 has fixed thereto a gear 93 which meshes with gear 94 mounted on and for rotation with shaft 95. Shaft 95 carries at one end thereof actuator 78 which again controls switch 79. At its other end, shaft 95 has fixed thereto gear 74 which, as described in connection with FIGURE 4, is in mesh with gear 75 driven by motor 76. The ratio of gears 93 and 94 is two to one so that for each complete cycle of switch 79 corresponding to the duration of one open and one closed period, polar member 92 rotates 180° from the position shown dotted with its longitudinal axis in line with the ends of core 61 through a position normal thereto. Polar member 92 more or less shunts the magnetic circuit at a cyclic rate of 20 c.p.s. as it is rotated to provide modulation of the reluctance of the magnetic circuit between coil 12 and mold 10 at a 20 c.p.s. rate with a resultant 20 c.p.s. frequency amplitude modulation of the 20 c.p.s. bridge frequency. In practice, the timing of the arrival of the polar member 92 at its positions of maximum and minimum effect on the impedance of coil 12 with respect to the opening and closing of switch 79 is adjusted so that the passage through zero of the 20 c.p.s. amplitude modulation frequency occurs in phase with the opening and closing of switch 79.

In operation coil 12 is normally positioned at a predetermined distance from the surface of the mold 10 whose temperature is being measured, the distance being about one-half inch. The automatic adjustment of phase shifter 34 takes place so as to null out the effect which distance variations between coil 12 and the mold would otherwise have upon the accuracy of the temperature measurement. Closing of switch 84a initiates the cycle of timer 84 as has been described. When the temperature of any one of the molds as shown on the chart of recorder 26, deviates from the desired value, the operator adjusts the valve 182 controlling the flow of air through conduits 181 to that mold. The flow of cooling air is increased or decreased depending upon whether the temperature of the mold is above or below the desired value. As will be more fully pointed out hereinafter, the rate of cooling of the molds may be automatically controlled.

The arrangement as thus far described provides unique advantages when the distance between coil 12 and the successive objects whose temperature is to be determined does not vary widely. When it is necessary to take into account larger distance variations such as may result when molds of different thickness are mounted on the press and are presented in succession to the sensing apparatus, I preferably utilize means for automatically adjusting the distance between coil 12 and the surface of the mold whose temperature is to be measured. One such arrangement is shown in FIGURE 6 wherein amplifier 19 is coupled through a second transformer 100 to a phase detector-amplifier 101, transformer 100 being in parallel with transformer 21. Bridge network 15 as well as the other circuit components which precede amplifier 19, as shown in FIGURE 3, are also included in the system shown in FIGURE 6 and for convenience are there designated by the same reference characters utilized in FIGURE 3. It is to be noted that the parts designated by the same reference characters used to designate the same parts in FIGURE 3 may be identical in all respects and function as was described in connection with FIGURE 3. The reference or switching voltage for phase detector-amplifier 101 is derived from phase shifter 34 with a further phase shift provided by phase shifter 102. It will be remembered that the output from phase shifter 34 under the influence of servomotor 33 was maintained at such a phase relationship with signal components corresponding to distance dependent impedance changes that phase detector-amplifier 20 operates at minimum sensitivity to such components. By the further phase shift provided by phase shifter 102, a 200 c.p.s. frequency switching voltage is provided which after being amplified at 103 is applied to the center tap of the secondary winding of transformer 100, the latter being coupled to the input of phase detector-amplifier 101 as was described in connection with phase detector-amplifiers 20 and 31. This switching voltage has a phase relationship with the error signal fed from bridge 15 through amplifier 19 and phase detector-amplifier 101 such that the output from phase detector-amplifier 101 is a function of the distance between monitoring coil 12 and the mold 10 under observation. When a visual indication of the distance between the coil and the mold is desired the output from phase detector-amplifier 101 is passed through a suitable distance indicating device 104 which may be in the form of a voltmeter provided with a scale calibrated in inches or other suitable unit of measure. Distance indicator 104 is in turn connected through a voltage comparator or add-or-subtract network, indicated generally at 105, to a 60 c.p.s. modulator or chopper 108. Comparator network 105 may be provided in any convenient manner so that when the output from phase detector 101 fed to the comparator has a value indicating that monitoring coil 12 is at the desired interval from the object irradiated, then the input to chopper 108 is zero or of insufficient magnitude to result in a shift in the position of the monitoring coil as will be described. A suitable comparator network comprises, as indicated, a resistor 106a having one terminal connected to distance indicator 104, as indicated, and having its other terminal connected to chopper 108. The movable tap of a resistor 106 which is in turn connected across a source of D.-C. voltage indicated by a battery is connected through a resistor 107 to the common terminal of resistor 106a and chopper 108. The voltage picked off from resistor 106 is compared to that fed from indicator 104. Modulator 108 is connected to amplifier 109 which in turn is connected to servomotor 111.

Servomotor 111 is mounted on carriage 51 and is connected through a suitable gear train to rotatably mounted screw 52 which is in threaded engagement with collar 112, the latter being in turn connected to platform 50. The duration and direction of operation of servomotor 111 provides a corresponding rotation of screw 52 to thereby adjust the position of collar 112 and platform 50 relative to carriage 51.

The reference voltage provided by resistor 106 establishes the normal position of platform 50 relative to carriage 51 because an output is available from comparator 105 only in the event and corresponding to the extent that the voltage from indicator 104 is greater or less than the reference voltage. Servomotor 111 is deenergized once the monitoring coil 12 arrives in the desired position and the resulting voltage fed through indicator 104 balances the reference voltage.

Operation of the system shown in FIGURE 6 will now be explained, it being assumed that the alternate molds 10 mounted on the press have a horizontally presented surface which projects about .25 inch above the surface of the remaining molds, the surfaces of the latter extending substantially in the same horizontal plane. At the start of operation the movable tap of resistor 106 is adjusted to provide a reference voltage such that, with carriage 51 in its down position, coil 12 is positioned approximately one-half inch from the first mold whose temperature is to be determined. The press is put into operation and when said first mold is in the temperature sensing position, carriage 51 is moved downward and switch 84a closes, thereby initiating the cycle of timer 84. As shown in FIGURE 6, timer 84, in addition to the control circuits described in connection with FIGURE 3, now also controls the energizing circuit of servomotor 111 through switch TS3. The program of timer 84 is now adjusted so that after carriage 51 reaches its downward position, switch TS1 is initially maintained in its position which disconnects the recorder 26 from phase detector-amplifier 20, switch TS2 controlling servomotor 33 is also kept open while switch TS3 is now closed. Platform 50 is positioned relative to carriage 51, by rotation of screw 52 if a voltage appears at the output side of comparator 105, so that coil 12 is spaced about the desired .5 inch from the surface of the mold.

As has been pointed out, the change in impedance of coil 12, due to the effect of the mold, results in an error signal. At the same time coil 12 is being displaced 20 times per second in the manner described in connection with FIGURE 4. Consequently, upon closing of switch TS2 by timer 84 after a sufficient time interval to permit servomotor 111 to complete its operation and while switch TS3 is still maintained closed, servomotor 33, as described in connection with FIGURE 3, now adjusts phase shifter 34 until the 20 c.p.s. signal from phase detector-amplifier 31 is nulled out. This adjustment indicates that the system has been balanced to take into account the distance between monitoring coil 12 and mold 10. After a sufficient interval of time to permit the operation of both servomotors 33 and 111, timer 84 opens switch TS3 and shifts switch TS1 to connect recorder 26 to phase detector-amplifier 20. If desired, switch TS2 may also be opened at this time. Upon completion of the temperature recording operation, timer 84 runs through its cycle to open switch TS2 if not already open, switch TS3 already being open at this time, and shifts switch TS1 to disconnect recorder 26 from phase detector-amplifier 20. Press table 11 then indexes.

When the next mold arrives into position, carriage 51 is again lowered and switch 84a again closes to initiate another cycle of operation of timer 84. In view of the assumed difference between the levels of successive molds, the phase relationship between the temperature dependent and distance dependent components of the impedance changes differs from the relationship between them when the previous mold was irradiated. This difference appears in the output of phase detector-amplifier 101 to provide a voltage at the output of comparator 105 having a sign determinative of the direction of and having an amplitude determinative of the duration of rotation of motor 111 to rotate screw 52 and adjust the distance between the monitoring coil 12 and the surface of the mold. The remainder of the operation is as has been described, the final accurate positioning of the monitoring coil taking place after switch TS2 is closed and adjustment of phase shifter 34 being effected to reflect the difference in temperature between the mold previously irradiated and the one now under observation.

It may be well to point out here that the 20 c.p.s. displacement of coil 12 for a distance of 0.001 inch does not result in energization of servomotor 111 in a direction to compensate therefor because it appears as an A.-C. component superimposed on the D.-C. output of phase detector-amplifier 101 and is readily filtered out and passed to ground through capacitor 115.

Referring now to both FIGS. 6 and 9 it will be shown that the accuracy of the distance measurement and the consequent adjustment of the position of coil 12 with respect to the mold under observation is improved when the phase angle between the phase shifter 102 and phase shifter 34 is adjusted in accordance with the instantaneous temperature of the mold. To this end the voltage fed to temperature recorder 26 may in turn be fed to a servo system 116 which is linked, as indicated in FIGURE 9, to phase shifter 102 through a suitable gear train. In this case, switch TS1 is operated by timer 84 at the same time that switch TS2 is closed or all three switches may be shifted simultaneously. Because the output fed through recorder 26 is not nulled out due to adjustment of phase shifter 102, the servo system 116 provided between the recorder 26 and phase shifter 102 differs from that described as following distance recorder 104 in that it includes a self-balancing network as is well known, for example, a resistance bridge having an arm with a slider which is adjusted simultaneously with adjustment of phase shifter 102 to a condition of balance with zero potential across its output terminals.

Instead of deriving the distance measuring voltage from the 200 c.p.s. error signal as was described in connection with FIGURE 6, I may also derive this distance measuring voltage from the 20 c.p.s. modulation component of the error signal as will now be described in connection with FIGURE 7 where those components of the system which are identical to those described and shown in FIGURE 3 are again designated by the same reference characters. In the present instance the output from amplifier 19 in addition to being fed to phase detector-amplifier 20 is also fed to detector 120 and through capacitor 119, which functions as a D.-C. suppressor, to a distance indicator 121. The output from indicator 121 is a D.-C. voltage proportional to the 20 c.p.s. component of the error signal and is fed to voltage comparator network 122 similar to comparator 105 and also followed by a 60 c.p.s. chopper or modulator 123, amplifier 124 and servomotor 111a. The reference voltage for comparator 122 is supplied from battery 126 through variable resistor 127. As was pointed in connection with the adjustment of resistor 106 (FIGURE 6), the adjustment of the variable tap of resistor 127 establishes the normal distance between platform 50 and carriage 51. Motor 111a corresponds to motor 111 and is connected through suitable gears to screw 52.

Just as was pointed out in connection with the 200 cycle error signal, the 20 c.p.s. modulation frequency comprises both temperature and distance dependent components. However, the effect of variations in the temperature of the object under observation varies with the frequency of the measuring signal and affects the lower 20 c.p.s. modulation frequency to a lesser extent than the 200 c.p.s. frequency signal. The 20 c.p.s. modulation frequency resulting from the periodic displacement of coil 12 is a sinusoidal wave the amplitude of which is dependent upon the distance of the coil from the mold. For example, the periodic displacement of coil 12 through a distance of 0.001 inch from an initial position .5 inch from a mold surface results in a 20 c.p.s. signal having positive and negative going excursions of a given amplitude which is greater than that derived when, for example, the periodic displacement of the coil is carried out from an initial position .75 inch away from the surface of the mold.

The operation of the arrangement shown in FIGURE 7 will be clearly understood from the description of the operation of the apparatus shown in FIGURE 6. It should be noted here, that in the present instance the desired insensitivity of the servomotor 111a to the 20 c.p.s. fluctuations resulting from the periodic displacement of coil 12 is readily achieved by properly selecting or adjusting the time constant of detector 120.

Referring once again to FIGURE 4, the mounting and thermal isolation of coils 12 and 13 from the press, among other things, provides stability in the operation of the coils and the avoidance especially in respect of these components, of variations in their operating characteristics which results from their being temperature cycled. To this end thermostat 82 and heater winding 81 are adjusted to maintain optimum temperature conditions. The optimum operating temperature may be readily determined once the characteristics of and the type of wire in the components are known. In accordance with yet another feature of the present invention the undesirable effects of such operating conditions as temperature as well as drift due to aging of the components are effectively nullified as will now be pointed out in connection with FIGURE 8.

Referring now to FIGURE 8 a variable inductor 130 and a variable resistor 131 are connected respectively in series and parallel relation with coil 12 of bridge 15. Bridge 15 is otherwise the same as has been described in connection with FIGURE 8 as are also the remaining components which have been designated in FIGURE 8 by the same reference characters used in FIGURE 3. Phase detector-amplifiers 132 and 133 are in parallel relation and each is connected in series with amplifier 19. Thus, phase detector-amplifier 20 is in parallel with each of the phase detector-amplifiers 132 and 133. All three phase detector-amplifiers are also connected in parallel relation with one another to amplifier 35. Phase shifter 134 is connected in series between amplifier 35 and phase detector-amplifier 132 and phase shifter 135 is similarly connected between amplifier 35 and phase detector-amplifier 133. Phase shifter 134 is adjusted so that the switching voltage fed from amplifier 35 is of such phase with respect to the 200 c.p.s. error signal that the output from phase detector-amplifier 132 reflects changes in the 200 c.p.s. error signal resulting from the inductive impedance of bridge 15 and substantial insensitivity to changes resulting from the resistive impedance of the bridge. Similarly phase shifter 135 is adjusted so that the switching voltage fed from amplifier 35 to phase detector-amplifier 135 is of such phase with respect to the 200 c.p.s. error signal that the output of phase detector-amplifier 133 is a function of changes in the resistive impedance of bridge 15 and is substantially insensitive to changes in the inductive impedance of the bridge.

The output from phase detector-amplifier 132 is fed to servomotor 136 through 60 c.p.s. chopper 137 and amplifier 138 so that motor 136 is operated for a duration corresponding to the amplitude of the voltage from phase detector-amplifier 132 and in a direction corresponding to the phase relationship between the input to phase detector-amplifier 132 from amplifier 19 and the reference voltage fed from amplifier 35. Similarly, servomotor 139 is fed from phase detector-amplifier 133 through series connected 60 c.p.s. chopper 140 and amplifier 141. As indicated, servomotor 136 and servomotor 139 are linked respectively to inductor 130 and resistor 131 through suitable gear trains. Switches TS4 and TS5 are connected in the energizing circuits of motors 136 and 139, respectively, and are controlled by timer 84.

With the automatic self-balancing or zeroing means just described in connection with FIGURE 8 included in the system, timer 84 is adjusted to open switches TS4 and TS5 at the start of its cycle when carriage 51 is moved toward press table 11 and to close switches TS4 and TS5 at the end of its cycle so that these switches are closed when carriage 51 is in its raised position. It is, therefore, evident that during the period carriage 51 is raised, servomotors 136 and 139 are energized in response, respectively, to the appearance of an output voltage from phase detector-amplifiers 132 and 133. At the start of an operation, carriage 51 being raised, adjustment is made so that bridge 15 is calibrated to provide an output voltage which is a function of and accurately reflects changes in temperature over the desired range. The phase angle relationship between phase shifters 34, 134 and 135 is such that with the inductive and resistive components of bridge 15 properly adjusted and balanced, servomotors 136 and 139 remain unenergized.

A change in the characteristic of any of the components of bridge 15 which is reflected in a change in the inductive or resistive impedance of the bridge causes a variation in the phase and amplitude of the 200 c.p.s. signal which is detected and amplified. Phase detector-amplifier 132 detects phase shift resulting from a change in the inductive impedance of the bridge and feeds the resulting voltage to servomotor 136 which, in turn, adjusts inductor 130 in a direction and for a duration necessary to restore the inductive impedance of bridge 15 to the aforementioned condition in which servomotor 136 is unenergized. Similarly, phase detector-amplifier 133 detects voltage resulting from a change in the resistive impedance of the bridge and feeds the resulting voltage to servomotor 139 which, in turn, adjusts resistor 131 in a direction and for a duration necessary to restore the resistive impedance of bridge 15 to said condition in which servomotor 139 is unenergized.

It is to be noted that while the foregoing arrangement for effecting automatic rebalancing of bridge 15 so as to insure a maximum degree of stability and freedom from drift and other undesirable effects, has been described in connection with the arrangement shown in FIGURE 3, it is equally effective in connection with the arrangements shown in FIGURES 6 and 7 which include the automatic monitoring coil positioning means. Such arrangements are, therefore, included within the present invention. The combination of the automatic position adjusting means described in connection with FIGURE 6 with the apparatus shown in FIGURE 8 is readily effected by connecting phase shifter 102 in series with phase shifter 34 (FIGURE 8) and in parallel with amplifier 35 as before. In series with phase shifter 102 there is provided the series connected amplifier 103 and phase detector-amplifier 101. The primary of transformer 100 is, like the corresponding coupling transformers of phase detector amplifiers 132 and 133, connected in parallel with the primary of transformer 21 between amplifier 19 and phase detector-amplifier 20. The series connected distance indicator 104, comparator network 105, chopper 108, amplifier 109 and servomotor 111 are provided with the indicator 104 connected in series with the output side of phase detector-amplifier 101. The operation of this combination is clearly apparent from the preceding description and requires no further elaboration here. However, it may be well to note that because the rebalancing of bridge 15 effected by adjustment of inductor 130 and resistor 131 is carried out with carriage 51 in its raised position and the automatic adjustment of the position of monitoring coil 12 is effected with the carriage in its down position, the two operations do not occur simultaneously and there is no possibility of interference between them. Timer 84 which now controls switches TS1–5 opens switches TS4 and TS5 before it closes switch TS3. Switch TS3 is opened before, at the end of the cycle of the timer, switches TS4 and TS5 are again closed.

From the foregoing, the combination of the automatic position adjusting means shown in FIGURE 7 with the apparatus shown in FIGURE 8, as well as its mode of operation, is clearly apparent. It should also be noted that the variable impedance members shown in FIGURE 8 may be located elsewhere than as shown in bridge 15. Furthermore, a variable capacitor may be used instead of variable inductor 130 which may be connected in parallel with reference coil 13.

It is evident from the foregoing that in accordance with the present invention an effective, accurate arrangement is provided for determining the temperature of an object through space which is independent of ambient temperature conditions. While the present invention has been described in detail as embodied in a system in which the temperature monitoring means is an electromagnetic radiator in the form of a coil it is to be noted that under certain conditions it is advantageous to utilize capacitive elements as the monitoring and reference means rather than coils such as coils 12 and 13. For example, this is the case when the object whose temperature is to be determined has little or no effect with changes in its temperature upon the inductive impedance of the monitoring means.

Referring now to FIGURE 10, capacitor 150 comprises two electrically conductive plates 150a and 150b which are supported with their radiating surfaces juxtaposed to the surface 151 of an object whose temperature is to be determined. As shown in FIGURE 11, capacitor 150 formed by plates 150a and 150b forms one arm of a bridge network 152, the remaining arms of which are formed by the secondary winding of bridge transformer 153 and reference capacitor 154.

As is well known and understood by those skilled in the art, the impedance diagram which represents graphically the effect on the impedance of a circuit due to the presence of a capacitor to be complete must include a resistive component as well as a capacitive component. Referring to FIGURE 2, there, in accordance with the usual convention, the resistive impedance is plotted along the horizontal axis and the inductive impedance is plotted along the axis which extends vertically from the resistance axis. In the corresponding impedance diagram showing the effect of changes in the temperature of object 151 and the distance between plates 150a and 150b from object 151, the resistive impedance component is also plotted along the horizontal axis and the capacitive impedance $$-\frac{1}{\omega C}$$

will be plotted along the vertical axis which is 180° out of phase with that along which the inductive impedance is plotted. The capacitance and the resistance of capacitor 150 are each affected by the distance of plates 150a and 150b from and the temperature of object 151, plates 150a and 150b extending in substantially the same plane and substantially parallel with the surface of object 151. An increase in the distance results in a decrease both of the capacitance and the resistance. With the distance constant, an increase in the temperature of object 151 causes a variation in the capacitance and in the resistance. If plotted on an impedance graph similar to that shown in FIGURE 2 but in the appropriate quadrant, it will be observed that the direction of an impedance change indicates whether the change resulted from a change in temperature or a change in distance. Here also, the phase relationship between the temperature dependent component and the distance dependent component of a signal derived from such an impedance change varies with the temperature of the object under observation. It is therefore necessary, in order to obtain accurate temperature measurements, to take into account the variations in phase shift required at different temperatures to null out the effect of incidental distance changes.

It will be evident from FIGURE 11 that the remaining circuit components of the apparatus there set forth are essentially the same as those shown for example, in FIGURE 3. A suitable oscillator 155 is connected to amplifier 156 which is in turn connected to a filter 157. The output side of filter 157 is connected to the primary winding of transformer 153. The output terminals of bridge 152 are formed by the center tap of the secondary winding of transformer 153 on the one hand and the common junction of monitoring capacitor 150 and reference capacitor 154. These terminals are coupled through transformer 158 to amplifier 159 which is in turn connected to the input side of the phase detector stage of phase detector-amplifier 160. Phase shifter 161 is connected to the outside terminals of the secondary winding of bridge transformer 153 in parallel with the series connected capacitors 150 and 154. Thus, the operating frequency fed through transformer 153 to bridge 152 is also fed to phase shifter 161, the latter being connected through amplifier 162 to the phase detector stage of phase detector-amplifier 160 so as to provide thereto a reference or switching voltage. The output side of phase detector-amplifier 160 is connected through variable resistor 163 to the energizing coil of a suitable temperature recorder 164 which may also be of the type provided with a driven chart and a stylus the position of which relative to the chart is governed by said coil.

In order to maintain the desired phase relationship between the output from phase shifter 161 and the operating frequency of the error signal supplied by bridge 152 to phase detector-amplifier 160, the impedance of the bridge network is modulated at a cyclic rate so as to amplitude modulate the error signal at a frequency which may be readily detected and separated from the operating frequency. For example, the operating frequency provided by oscillator 155 may be about 20 megacycles per second and the modulating frequency may be 20 c.p.s. or other desired frequency. Referring once again to FIGURE 10, the desired modulation is effected in a manner similar to that described in connection with FIGURE 4 and by connecting one or both, as shown, of the plates 150a and 150b to a rod 166 which in turn is connected to arm 68 for oscillation therewith. Arm 68 is supported on support member 70 for oscillation about its pivot 69 as shown in FIGURE 4 and is driven by motor 76 through cam 72a on the shaft 72, the latter of which carries actuator 78 positioned to open and close switch 79. It is evident therefore that platform 167 corresponds to the hereinbefore described platform 50 and the parts mounted on platform 167 have been designated by the same reference characters utilized in connection with FIGURE 4 for the sake of simplicity.

The link between motor 76 and capacitor 150 of bridge 152 is indicated diagrammatically in FIGURE 11 as is also the link between motor 76 and reference voltage generator 168, generator 168 including switch 79 one side of which is grounded as was pointed out in connection with low frequency reference generator 32 (FIGURE 3). The voltage from reference generator 168 is applied to phase detector-amplifier 169. The modulation frequency voltage components, in the present instance at 20 c.p.s. appear across the secondary of transformer 153 and in turn appear in the output of phase detector-amplifier 160 where, due to the A.-C. coupling provided by capacitor 170, it is by-passed to tuned amplifier 171. The output of amplifier 171 together with the switching voltage from generator 168 provides the input of detector-amplifier 169 whose output is an average D.-C. voltage having an amplitude and a polarity which correspond respectively to the amplitude of the 20 cycle modulating voltage at the output of detector-amplifier 160 and the cosine of the phase angle between the 20 cycle reference switching voltage and said 20 cycle modulating voltage.

As in the case of the apparatus described in connection with FIGURE 3, this output from detector-amplifier 169 is utilized to operate servomotor 172 for a duration and in a direction corresponding respectively to the amplitude and polarity of the voltage applied thereto; the detector-amplifier output voltage being fed through 60 c.p.s. modulator or chopper 173 to amplifier 174 and servomotor 172. Servomotor 172 is connected through a suitable gear train to the tuning shaft of phase shifter 161 which is coupled across the secondary of transformer 153 in parallel with capacitors 150 and 154. Servomotor 172 adjusts phase shifter 161 so that the output of the latter amplified at 162 provides a 20 megacycle switching voltage to detector amplifier 160 having such a phase relationship to the 20 megacycle error signal fed through amplifier 159 as to be in quadrature with the signal resulting from the distance modulation of capacitor 150 so as to null out the 20 cycle voltage which would otherwise appear at the output of detector-amplifier 160.

The apparatus as thus far described is intended, for example, for use in conjunction with a press, the molds 10 of which are cooled by means of a coolant such as air delivered throuh a manifold 180 to conduits 181 which in turn communicate with each of the molds 10. As thus far described an operator may observe the recordings for each of the molds 10 on the chart of recorder 26 and by suitably adjusting valves 182 may regulate the flow of cooling air to the molds so that their temperature is maintained at the desired level. In practice, temperature variations in any one of the molds 10 may be utilized in order to determine the cooling rate required by all of the molds. Thus, instead of manual valves 182 as shown in FIGURE 1, I may utilize a valve 183, as shown in FIGURE 12, mounted in manifold 180 and having a stem 184 adjustment of which more or less opens the valve from a pre-set position. The stem 184 is connected through a suitable gear train to servomotor 185 which forms part of a servosystem 186. Servosystem 186 may be similar to that described in connection with FIGURE 9 and may also be connected in series with temperature recorder 26. A switch 187 controlled by relay 188 completes the circuit to servomotor 185 when closed. Relay 188 is connected to a source of electrical power through a switch 189 positioned to be closed by a tab 190 when the temperature of a particular one of the molds is being observed. Thus, once in each revolution of press table 11 switch 189 is closed to energize relay 188 which in turn closes switch 187 controlling the circuit to servomotor 185. As is well known to those skilled in the art of servomechanisms, the self-balancing bridge of the servosystem 186 is adjusted to provide a zero voltage so long as the voltage from temperature recorder 26 reflects a predetermined temperature of the mold under observation. With switch 187 closed, servomotor 185 is energized for a duration and in a direction corresponding to the amount and direction in which the mold's temperature departs from the preselected value so that the flow of cooling air is automatically increased or decreased as the voltage to recorder 26 reflects an increase or decrease in the temperature of the mold from the desired value. It is to be understood that when the apparatus is put into operation valve 183 is initially adjusted to provide a flow of cooling air adequate to maintain the molds at a predetermined value.

It is to be noted that conventional and well known arrangements for adjusting or zeroing bridge networks have been omitted because they are neither part of nor required for a full understanding of the present invention. For example, the desired range of operation may be readily provided by utilizing suitable impedances in circuit with the bridge 15 and, as is well known, this provides for the desired sensitivity over the operating range.

It should also be noted that while the present invention has been described in detail in connection with the measurement of temperature and distance, it may be readily utilized for the purpose of measuring other characteristics of an object such as, for example, its resistivity. In the foregoing description the electrical characteristics of molds 10 remain stable and, once taken into account for zeroing the apparatus in the desired range of operation, may be ignored except for such periodic adjustment as may be necessary to take into account those variations which may occur during the life of the molds. However, when the unknown to be measured is a property such as resistivity and the temperature of the object under observation is kept substantially constant, automatic adjustments are made to null out the effects of variations in the distance between the object and the radiator.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

What is claimed is:

1. In an apparatus for irradiating, with an electrical wave of a first frequency propagated by an energy radiating means, an object whose absorption of energy from said radiating means is a function of two unknown quantities, and for measuring variations in one of said quantities: energy radiating means, a network in which said energy radiating means comprises one element, a signal generator providing a reference voltage at said first frequency coupled to said network, the output of said network comprising an error signal variations in which are representative of variations in the energy absorption of said object, means for varying the other of said quantities at a second frequency to modulate said error signal at said second frequency, a phase shifter coupled to said signal generator and having an output comprising a phase-shifted reference voltage, means applying said phase-shifted reference voltage and said modulated error signal to a first phase detector adapted to provide an output voltage having a direct current component and an alternating current component of said second frequency, the direct current component of which is a function of the amplitude of the first frequency component of said modulated error signal that is in phase with said phase-shifted reference voltage and the amplitude of the second frequency alternating component of which is a function of the amplitude of the second frequency modulation of that component of the error signal in phase with said phase-shifted reference voltage, and means responsive to said alternating current component for shifting the phase of said phase-shifted reference voltage to minimize any second frequency modulated component appearing in said first phase detector output whereby said first phase detector output voltage represents only said one quantity and is independent of variations in said other quantity.

2. The device of claim 1 wherein said one quantity is the temperature of said object and said other quantity is the distance of said radiating means from said object.

3. The device of claim 2 wherein said radiating means is an inductor and said means modulating said error signal comprises means for varying said distance between said inductor and said object at said second frequency.

4. The device of claim 3 further comprising means applying said phase-shifted reference voltage at said first frequency to a second phase shifter the output of which is a second phase-shifted reference voltage at said first frequency, means applying said second phase-shifted reference voltage and said modulated error signal to a second phase detector to derive an output signal therefrom whereby when the phase of said output signal from said second phase shifter is adjusted to minimize that component of the modulated error signal representing the temperature quantity, said output voltage from said second phase detector is substantially a function of said distance quantity.

5. The device of claim 4 wherein said output voltage is applied to a distance control system to continuously shift the position of said radiating element to maintain said radiating means at substantially the same distance from said object.

6. The device of claim 5 further comprising means responsive to said first detector output for controlling the temperature of said object.

7. The device of claim 5 wherein said first detector output is applied to a phase controlling means to continuously adjust the phase of said second phase shifter.

8. The device of claim 3 wherein the amplitude of the modulated component of said modulated error signal is detected to derive a distance control voltage the magnitude of which is an indication of said distance quantity.

9. The device of claim 8 wherein said distance control voltage is applied to a distance control system to continuously shift the position of said radiating element to maintain said radiating element at substantially the same distance from said object.

10. The device of claim 9 further comprising means responsive to said first detector output for controlling the temperature of said object.

11. The device of claim 3 further comprising a variable inductor in series with said radiating inductor and a variable resistor in parallel with said series combination of variable inductor and radiating inductor, means applying said phase-shifted reference voltage to third and fourth phase shifters respectively, the output of said third phase shifter being a third phase-shifted reference voltage, means applying said third phase-shifted reference voltage and said error signal to a third phase detector to derive an output signal therefrom whereby when the phase of said third phase-shifted reference voltage is adjusted to minimize that component of the error signal resulting from changes in the resistive impedance of said network, said third phase detector output voltage is substantially a function of changes in inductive impedance of said network and means applying said third phase detector output voltage to an inductance balancing system to balance the inductive component of said energy radiating means of said network and thereby compensate for changes in inductance due to non-induced changes in inductance, the output of said fourth phase shifter being a fourth phase-shifted reference voltage, means applying said fourth phase-shifted reference voltage and said error signal to a fourth phase detector to derive an output signal therefrom whereby when the phase of said fourth phase-shifted reference voltage is adjusted to minimize that component of the error signal resulting from non-induced changes in inductive impedance of said network, said fourth phase detector output voltage is substantially a function of changes in resistive impedance of said network, and means applying said fourth phase detector output voltage to a resistance balancing system to balance the resistive component of the radiating element of said network and thereby compensate for changes in resistance due to non-induced changes in resistance.

12. The device of claim 11 further comprising means responsive to said first detector output for controlling the temperature of said object.

13. The device of claim 2 wherein said radiating means is a capacitor and said network further includes a reference capacitor, said means modulating said error signal comprises varying said distance between said radiating capacitor and said object at said second frequency.

14. The device of claim 2 wherein said radiating means is an inductor and said means modulating said error signal comprises a polar member adjacent said radiating inductor and rotating at said second frequency to modulate the reluctance between said radiating coil and said object.

15. The device of claim 14 further comprising means applying said phase-shifted reference voltage at said first frequency to a second phase shifter the output of which is a second phase-shifted reference voltage at said first frequency, means applying said second phase-shifted reference voltage and said modulated error signal to a second phase detector to derive an output signal therefrom whereby when the phase of said output signal from said second phase shifter is adjusted to minimize that component of the modulated error signal representing the temperature quantity, said output voltage from said second phase detector is substantially a function of said distance quantity.

16. The device of claim 15 wherein said output voltage is applied to a distance control system to continuously shift the position of said radiating element to maintain said radiating means at substantially the same distance from said object.

17. The device of claim 16 further comprising means responsive to said first detector output for controlling the temperature of said object.

18. The device of claim 16 wherein said first detector output is applied to a phase controlling means to continuously adjust the phase of said second phase shifter.

19. The device of claim 16 wherein the amplitude of the modulated component of said modulated error signal is detected to derive a distance control voltage the magnitude of which is an indication of said distance quantity.

20. The device of claim 19 wherein said distance control voltage is applied to a distance control system to continuously shift the position of said radiating element to maintain said radiating means at substantially the same distance from said object.

21. The device of claim 14 further comprising a variable inductor in series with said radiating inductor and a variable resistor in parallel with said series combination of variable inductor and radiating inductor, means applying said phase-shifted reference voltage to third and fourth phase shifters respectively, the output of said third phase shifter being a third phase-shifted reference voltage, means applying said third phase-shifted reference voltage and said error signal to a third phase detector to derive an output signal therefrom whereby when the phase of said third phase-shifted reference voltage is adjusted to minimize that component of the error signal resulting from changes in the resistive impedance of said network, said third phase detector output voltage is substantially a function of changes in inductive impedance of said network and means applying said third phase detector output voltage to an inductance balancing system to balance the inductive component of said energy radiating means of said network and thereby compensate for changes in inductance due to non-induced changes in inductance, the output of said fourth phase shifter being a fourth phase-shifted reference voltage, means applying said fourth phase shifted reference voltage and said error signal to a fourth phase detector to derive an output signal therefrom whereby when the phase of said fourth phase-shifted reference voltage is adjusted to minimize that component of the error signal resulting from non-induced changes in inductive impedance of said network said fourth phase detector output voltage is substantially a function of changes in resistive impedance of said network, and means applying said fourth phase detector output voltage to a resistance balancing system to balance the resistive component of the radiating element of said network and thereby compensate for changes in resistance due to non-induced changes in resistance.

22. The device of claim 19 further comprising means responsive to said first detector output for controlling the temperature of said object.

References Cited in the file of this patent

UNITED STATES PATENTS

| | | |
|---|---|---|
| 1,943,619 | Mudge et al. | Jan. 16, 1934 |
| 2,011,710 | Davis | Aug. 20, 1935 |
| 2,017,859 | Holstead | Oct. 22, 1935 |
| 2,524,933 | Silverman | Oct. 10, 1950 |
| 2,536,111 | Van Dyke | Jan. 2, 1951 |
| 2,658,687 | Southworth | Nov. 10, 1953 |
| 2,753,520 | Doll | July 3, 1956 |
| 2,826,912 | Kritz | Mar. 18, 1958 |
| 2,914,726 | Harmon | Nov. 24, 1959 |
| 2,918,621 | Callan et al. | Dec. 22, 1959 |